(12) United States Patent
Ho

(10) Patent No.: US 7,362,685 B2
(45) Date of Patent: Apr. 22, 2008

(54) PRESS KEY OPERATING TYPE OPTICAL DISK DUPLICATING SYSTEM

(76) Inventor: Ming-Chiao Ho, 13F., No. 176, Jian Yi Rd., Jhonghe City, Taipei County (TW)

( * ) Notice: Subject to any disclaimer, the term of this patent is extended or adjusted under 35 U.S.C. 154(b) by 718 days.

(21) Appl. No.: 10/967,205

(22) Filed: Oct. 19, 2004

(65) Prior Publication Data

US 2006/0013100 A1    Jan. 19, 2006

(30) Foreign Application Priority Data

Jul. 15, 2004   (TW) ............................. 93121133 A

(51) Int. Cl.
*G11B 7/00* (2006.01)
(52) U.S. Cl. ........................ 369/84; 710/62; 361/686
(58) Field of Classification Search ............ 369/53.22, 369/47.1, 83, 84; 710/5, 62, 65; 361/686
See application file for complete search history.

(56) References Cited

U.S. PATENT DOCUMENTS 6,704,814 B2 *   3/2004   Liu et al. ...................... 710/62
7,190,654 B2 *   3/2007   Wu et al. ...................... 369/84

\* cited by examiner

*Primary Examiner*—Nabil Hindi
(74) *Attorney, Agent, or Firm*—Bacon & Thomas, PLLC

(57) ABSTRACT

The present invention discloses a press key operating type optical disk duplicating system, which comprises an optical disk burner, and the optical disk burner is connected to a personal computer for playing an optical disk (such as a CD or a DVD) loaded into the optical disk burner or performing the optical disk burning (copying of files to an optical disk) or optical disk duplication for an optical disk loaded into the optical disk burner. The optical disk burner comprises at least one function key, and each function key is connected to a control circuit, such that the function key is pressed as to turn on the control circuit and the corresponding program installed in the personal computer and execute a series of operations required for burning (writing to) or duplicating an optical disk. A user just needs to press a single function key to complete the duplication of a file to an optical disk (optical disk burning) or perform the duplication between a source optical disk and a blank optical disk in a simple and easy manner.

12 Claims, 4 Drawing Sheets

PRESS KEY OPERATING TYPE OPTICAL DISK DUPLICATING SYSTEM

BACKGROUND OF THE INVENTION

1. Field of the Invention

The present invention relates to an optical disk duplicating system, more particularly to an optical disk duplication system that utilizes press keys to control the duplicating operation of an optical disk burner.

2. Description of the Related Art

Currently, optical disk burners sold in the market include special burners for duplicating CD-R/W or DVD-RW optical disks, burners installed inside personal computer as a built-in optical disk burner, and burners externally connected to personal computer as an external optical disk burners. After an optical disk burner is connected to a personal computer and a driver program is installed, users are still unable to use the optical disk burner to duplicate or burn (write to) an optical disk directly. Users still need to install a duplicating program in the personal computer before they can run the duplication function provided by the duplicating program in a personal computer to duplicate a file to an optical disk (to burn or write to an optical disk) inserted into the optical disk burner or duplicate a source optical disk inserted into the optical disk burner. For either one of the operations of duplicating a file in the personal computer or duplicating a source optical disk, a user needs to switch the control screen provided by the duplicating program and click an appropriate option to run the correct burning or duplicating operations. Such process not only is complicated and laborious, but also is a big problem for beginners or general users. Taking the most popular duplicating program Nero for example, if a user wants to duplicate a file in the computer to an optical disk (burn an optical disk) or duplicate a source optical disk, the user needs to run the Nero duplicating program. After the program is run, the following options will appear on the screen of the computer monitor for users to click: "Function", "Data", "Sound Effect", "Digital Photo and Movie", "Copy and Backup" and "Program", etc. After a user clicks on "Function", the following options will further appear on the screen of the computer monitor: "Data CD", "Music CD", "VCD" and "Quick Copy", etc. After the user clicks on "Quick Copy", the screen of the monitor will show the following options: "Source CD", "Burner", "Option", "Write Speed", "No. of Copies", "Setup", "Saved Disk Track", "Erase", "CD Information", "Cover Design", "Maximum Speed", "Simulate" and "Write", etc, and so forth. When a user clicks on an option, the computer monitor will show a screen of the next level, and the screen of each level further includes several options and each option has a corresponding icon, configuration and meaning. All these make those who are not familiar with the duplication program Nero very confused and totally lost. Therefore, many users have to spend much time and efforts to learn the operation of the Nero program in order to execute the function of each option correctly. Since there are so many unfamiliar computer terms encountered in the learning process, therefore it takes lots of efforts and time to learn and causes frustrations easily. As a result, the willingness of using an optical disk burner to duplicate files or burn an optical disk becomes very low.

Therefore, it is an important objective to design an optical disk burner that can meet the user-friendly and easy-to-operate requirements, so that a user just needs to press a single function key disposed on the optical disk burner in order to drive the optical disk burner to duplicate a file to an optical disk (burn an optical disk) or duplicate an optical disk directly or use a simple, easy and user-friendly way to guide a user to burn or duplicate an optical disk through a personal computer quickly. The new design of the optical disk burner is similar to a fully automatic camera that only requires users to press the shutter to take a picture while aiming at a target object, and thus it can skip the preparation and adjusting operations of the traditional cameras including the settings of the diaphragm, shutter speed, and focal length. Therefore, the way of designing an optical disk burner is to allows a user to burn or duplicate an optical disk by just pressing a single function key and leaves all the complicated control operations to the optical disk burner and personal computer. Such design will become an important design model of optical disk burners as well as the optical disk burner industry in the future.

SUMMARY OF THE INVENTION

In view of the foregoing shortcomings of the traditional optical disk burner encountered in the process of duplicating a file to an optical disk or duplicating an optical disk, the inventor of the present invention conducted extensive researches and experiments and finally invented a press key operating type optical disk duplicating system. The press key operating type optical disk duplicating system of the present invention comprises an optical disk burner, and the optical disk burner is connected to a personal computer for playing, burning (writing to), or duplicating an optical disk (such as a CD or a DVD) loaded into the optical disk burner. The optical disk burner comprises at least one function key, and each function key is connected to a control circuit, so that when the function key is pressed to turn on the control circuit and the corresponding program installed in the personal computer, a series of operations required for burning or duplicating an optical disk are executed. A user just needs to press a single function key to successfully complete the burning of an optical disk or perform the duplication between a source optical disk and a blank optical disk in a simple and easy manner.

Therefore, the primary objective of the present invention is to add a control circuit having the capability of making logical determination to a traditional built-in or external optical disk drive. The control circuit comprises at least one General Purpose I/O (GPIO) port, and each GPIO port is connected to each function key, such that if the GPIO port detects a function key is pressed, then it will drive the corresponding software to produce an optical disk bucket icon to be shown on the screen of the personal computer and reside on the uppermost screen of the computer monitor. If a user wants to duplicate a file, the user just needs to click the file and drag it to the optical disk bucket icon.

Another objective of the present invention is to drive a corresponding software to show the messages such as "Please load a blank disk" or "Duplication completed" on the screen of a monitor to guide a user to quickly and successfully complete the file duplicating operation according to the instructions when the total number of files waiting for a duplication in the optical disk bucket icon reaches the maximum number for starting the file duplication, or the control circuit detects that another function key is pressed.

A further objective of the present invention is to drive a corresponding program to show the messages such as "Please load target disk", "Please remove target disk, and load blank disk", "Duplication completed" on the screen of a monitor to guide the user to quickly and successfully complete the optical disk duplicating operation according to the user-friendly instructions when the control circuit detects that another function key is pressed. Therefore, users no longer need to install and learn additional duplicating program or waste time and effort on the complicated duplicating operation to search for a way of completing the optical disk duplicating operation.

Another further objective of the present invention is to add a counter in the optical disk bucket icon or at a position next to the optical disk bucket icon for instantly showing the total amount of data sitting in the optical disk bucket by the counter, in addition to showing the optical disk bucket icon on the screen of the computer monitor.

The above objects, features and advantages of the present invention will become apparent from the following detailed description taken with the accompanying drawing. However, these drawings are provided for reference and illustration and not intended to act as a limitation to the present invention.

DETAILED DESCRIPTION OF THE PREFERRED EMBODIMENTS

Figure 1:
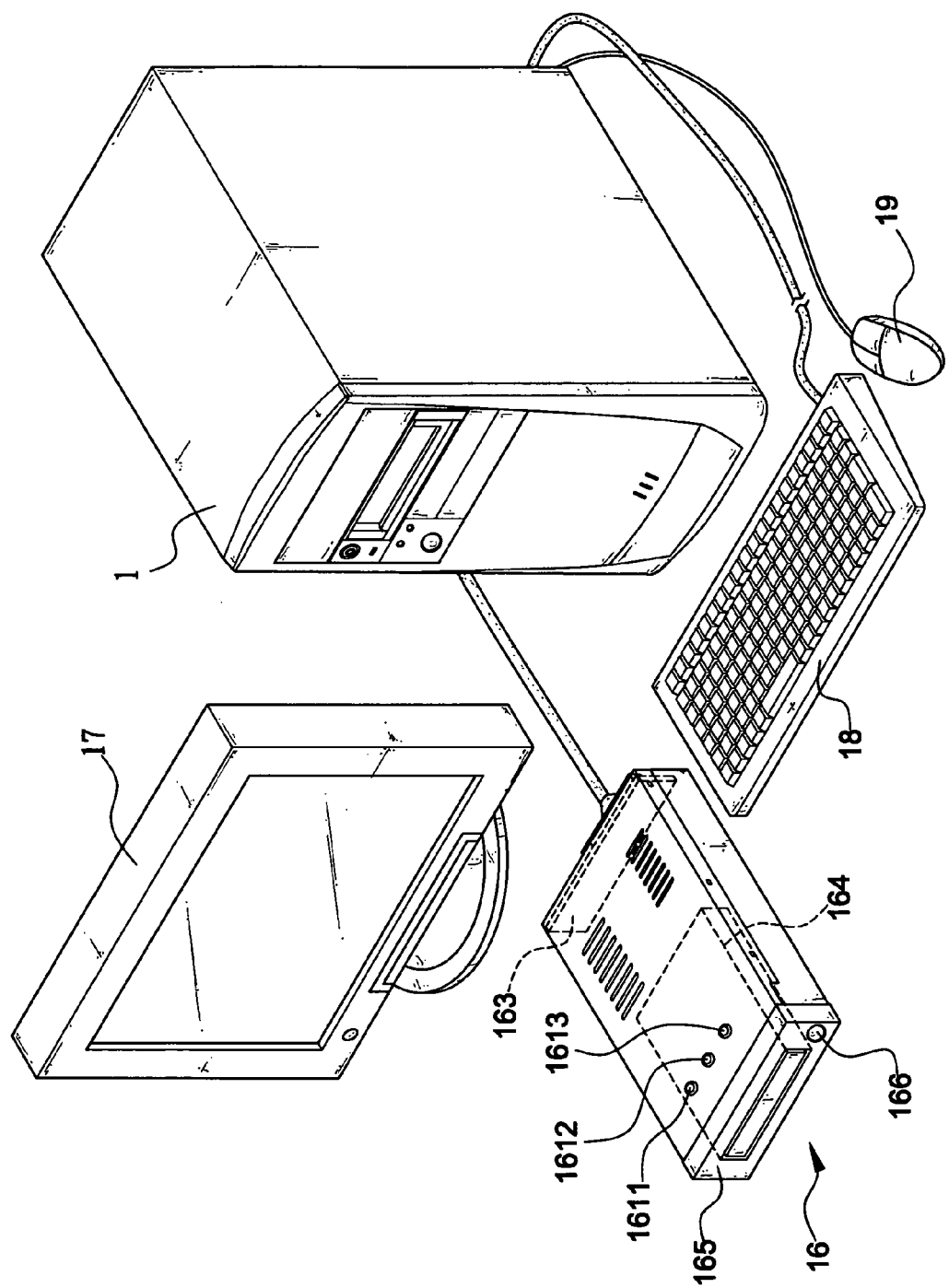
FIG. 1 is a perspective view of the press key operating type optical disk duplicating system according to the present invention.

Please refer to FIG. 1 for the press key operating type optical disk duplicating system for the present invention. The optical disk duplicating system comprises an optical disk burner 16, and the optical disk burner 16 is connected to a personal computer 1, It is not only capable of accessing the data on an optical disk (such as a CD or a DVD) that is loaded into the optical disk burner 16, but also capable of performing optical disk duplication or burning for an optical disk loaded into the optical disk burner 16. Please refer to FIG. 1 for a preferred embodiment of the present invention. The optical disk burner 16 is an optical disk burner externally connected to the housing of a personal computer. However, the implementation of the present invention is not limited to the use of an external optical disk burner, but the optical disk burner 16 could also be a built-in optical disk burner installed inside the housing of a personal computer. The optical disk burner 16 comprises a housing and the housing comprises an optical disk mechanism 164. A front panel 165 is disposed at the front side of the housing and an optical disk eject switch 166 is disposed on the front panel 165 for pushing out or pulling in the optical disk mechanism 164 as to allow users to load or remove an optical disk. The housing further comprises at least one function key 1611, 1612, 1613 thereon and a control circuit 163 therein, and the control circuit 163 comprises at least one general-purpose input/output port (GPIO port). Each GPIO port is connected separately to each function key 1611, 1612, 1613, such that if the function key 1611, 1612, 1613 is pressed, the control circuit 163 and the corresponding software installed in the personal computer 1 are turned on to execute a series of operations required for burning or duplicating an optical disk. Therefore, a user just needs to press a single function key 1611, 1612, 1613 as to successfully complete file duplication to an optical disk (burning an optical disk) or a duplicating operation between a source optical disk and a blank optical disk in a simple and user-friendly manner. In another preferred embodiment of the present invention, the function key 1611, 1612, 1613 must be installed on the front panel 165 to facilitate users to press the function key 1611, 1612, 1613 if the optical disk burner 16 is a built-in optical disk burner.

Figure 2:
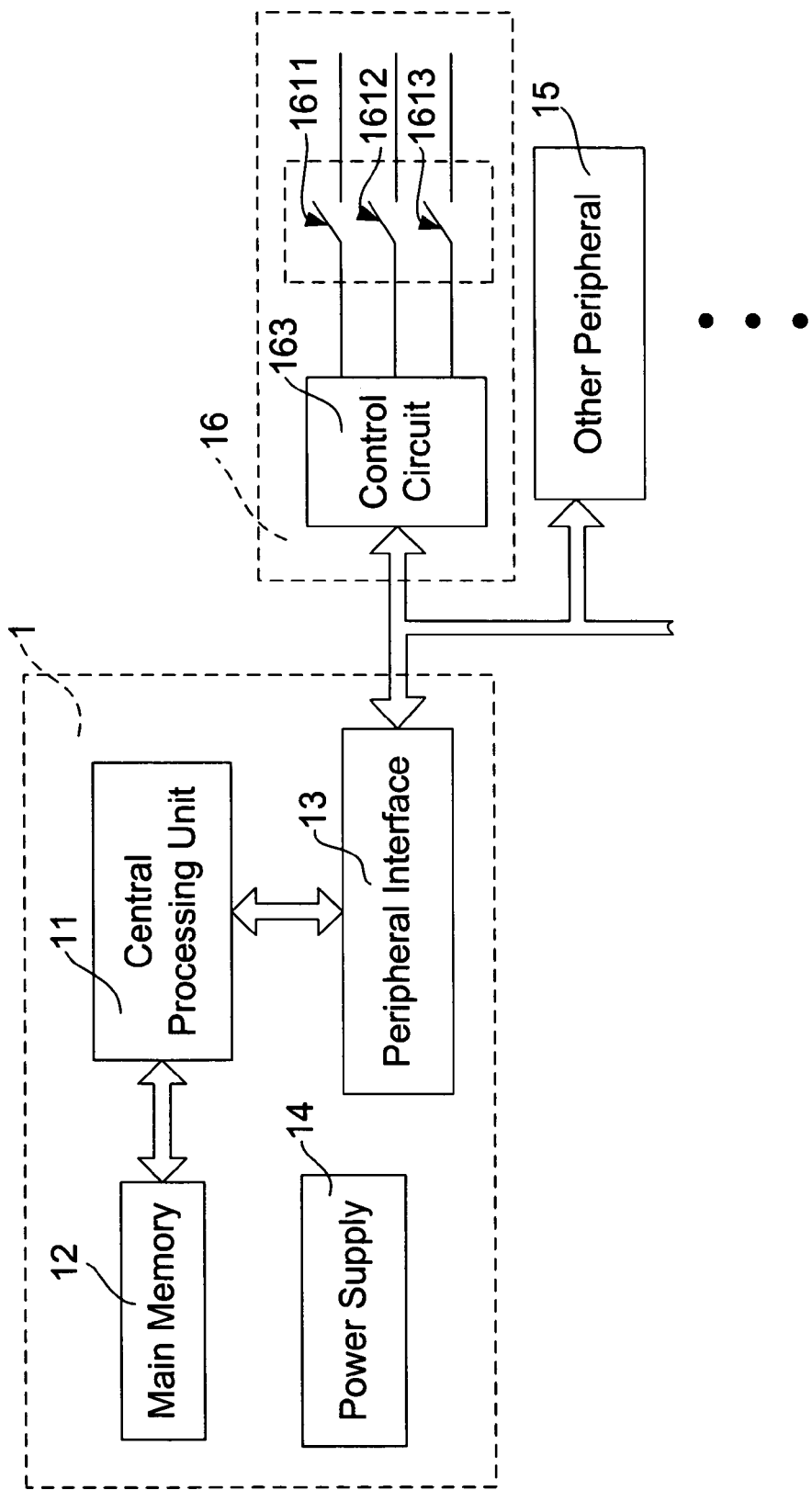
FIG. 2 is a block diagram showing the hardware architecture of the press key operating type optical disk duplicating system according to the present invention.

In the preferred embodiment as shown in FIGS. 1 and 2, the personal computer 1 comprises a central processing unit 11, a main memory 12, a plurality of peripheral interfaces 13, and a power supply 14, wherein the central processing unit 11 is used for controlling the normal operation of each electronic component in the personal computer 1, and the main memory 12 is connected to the central processing unit 11 for storing data or temporarily stored computing data, and each peripheral interface 13 is connected separately with the central processing unit 11 and the peripheral such as an optical disk burner 16, a monitor 17, a keyboard 18, a mouse 19 and other computer peripheral equipment 15 for acting as a conversion circuit among them. After a user connects the control circuit 163 of the optical disk burner 16 to a personal computer 1 through one of the peripheral interface 13 and installs a driver program of the optical disk burner 16 in the personal computer 1, the central processing unit 11 can control the optical disk burner 16 through the peripheral interface 13, and the optical disk burner 16 can also start the related software in the personal computer 1 through the peripheral interface 13 to execute a series of corresponding operations.

In this preferred embodiment, if a user wants to back up or duplicate files or data stored in the main memory 12 (or hard disk drive) to a blank optical disk installed into the optical disk burner 16, the user presses one of the configuration function keys 1611 to trigger the control circuit 163 to drive the corresponding software as to create an "environment for duplicating files by a simple operation" in the operating system of the personal computer 1 and produce an optical disk bucket icon on the screen of the monitor 17 such that the optical disk bucket icon resides at the uppermost level of the screen of the monitor 17. Therefore, if a user wants to duplicate a file, the user just needs to click on the desired file and drag it to the optical disk bucket. Until the total amount of files or data waiting in the optical disk bucket for a duplication is accumulated to a maximum number, or the control circuit 163 detects an optical disk burning function key 1612 is pressed, the corresponding software is driven to display a message such as "Please load a blank disk" or "Duplication completed" on the screen of a monitor to guide a user to quickly and successfully complete the file duplicating operation according to the instructions. While the optical disk bucket icon is generated on the screen of the monitor 17, this preferred embodiment could also add a counter in the optical disk bucket or at a position adjacent to the optical disk bucket for showing the total amount of data waiting for duplication in the optical disk bucket. Further, if a user wants to duplicate a source optical disk, the user can press an optical disk duplication function key 1613 to trigger the control circuit and drive the corresponding software to display the simple messages such as "Please load target disk", "Please remove target disk, and load blank disk", "Duplication completed" on the screen of a monitor to guide the user to quickly and successfully complete the optical disk duplicating operation according to the user-friendly instructions. Therefore, users no longer need to install and learn additional duplicating programs or waste time and effort on the complicated duplicating operation to search for a way of completing the optical disk duplicating operation.

Figure 3:
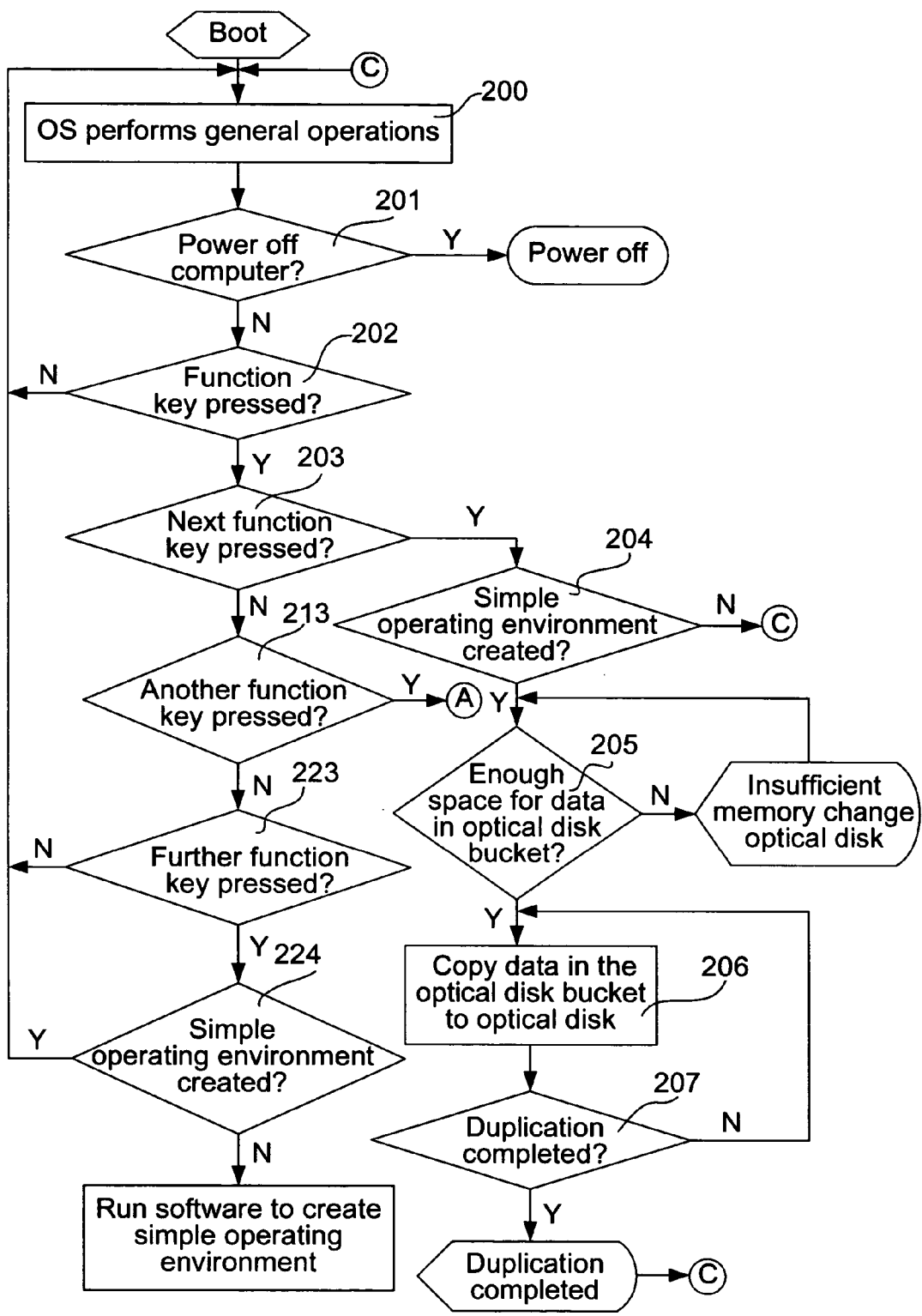
FIG. 3 is a flow chart of the press key operating type optical disk duplicating system according to the present invention.
Figure 4:
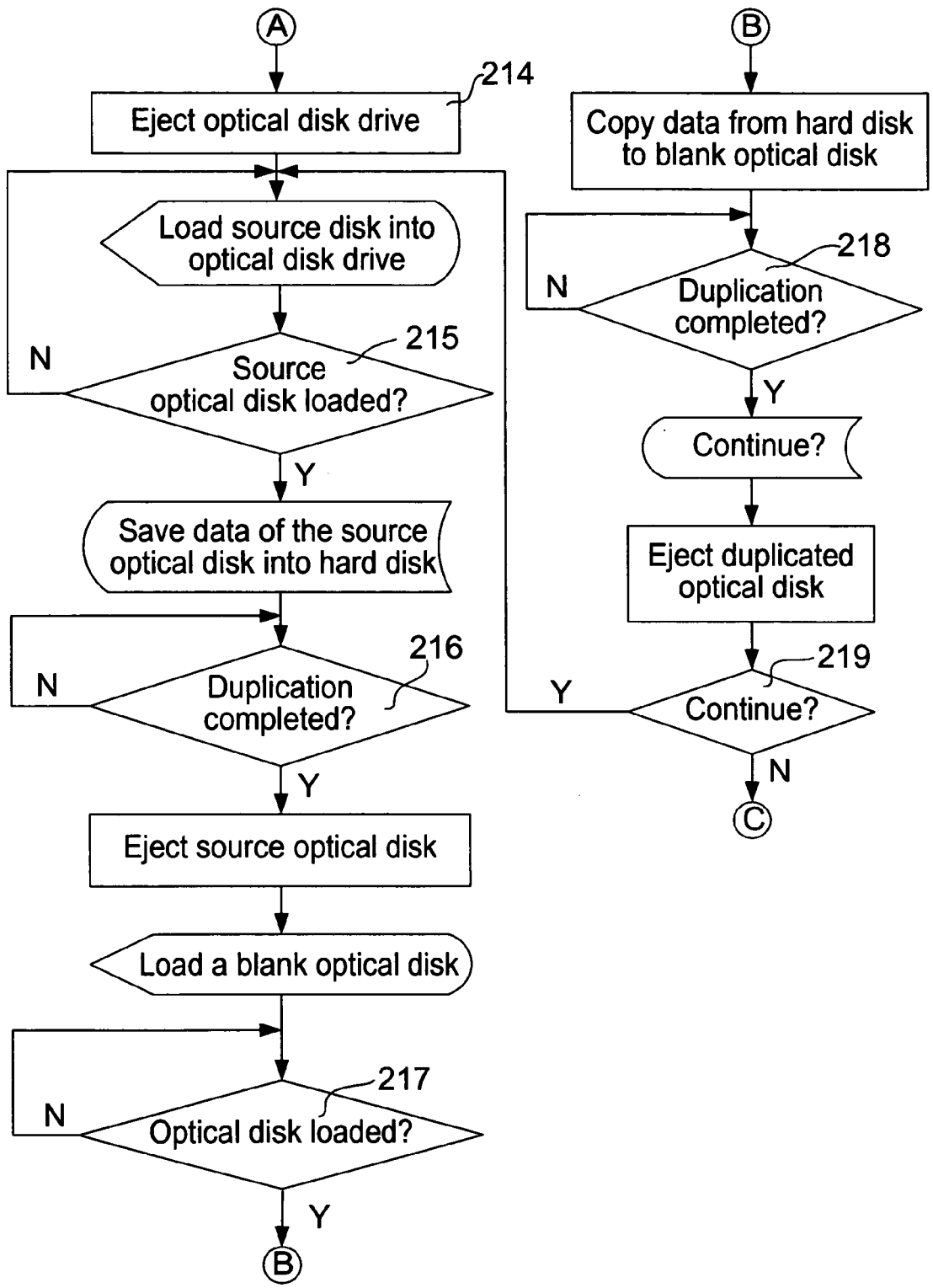
FIG. 4 is another flow chart of the press key operating type optical disk duplicating system according to the present invention.

In this preferred embodiment, the central processing unit 11 will perform the following operations as shown in FIGS. 3 and 4 according to the signal triggered by pressing a function key 1611, 1612, 1613 on the optical disk burner 16 after the personal computer 1 is booted.

(200) The central processing unit 11 performs a general operation according to the operating system of the personal computer 1.

(201) Determine whether or not a user turns off the personal computer 1; if yes, perform a shutdown operation; if no, go to step (202).

(202) Determine whether or not a trigger signal sent from the control circuit 163 is received and different trigger signals indicate the situation of each function key 1611, 1612, 1613 being pressed; if yes, go to step (203); if no, return to step (200) to perform the general operation.

(203) Determine whether or not the trigger signal generated by pressing the optical disk burning function keys 1612 is received; if yes, go to step (204); if no, go to step (213) to carry out further decision.

(204) Determine whether or not the operating system of the personal computer 1 has created an "environment for duplicating files by a simple operation"; if yes, go to step (205); if no, return to step (200) to perform the general operation.

(205) Detect and determine whether or not there is remaining or sufficient space in the optical disk which is loaded into the optical disk burner 16 for accommodating the data waiting for duplication in the optical disk bucket shown on the screen of the monitor 17; if yes, go to step (206); if no, display a message "Insufficient memory. Please change the optical disk." and after the user has changed the optical disk, return to step (205) to detect and determine the remaining space of the optical disk.

(206) Turn on the optical disk burner 16, and duplicate the data in the optical disk bucket to the optical disk.

(207) Detect whether or not the optical disk burner 16 has completed the duplication; if yes, display the message "Duplication completed" and then return to step (200) and continue the general operation; if no, then return to step (206) to continue the duplicating operation.

(213) Determine whether or not a trigger signal generated by pressing the optical disk duplication function key 1613 is received; if yes, go to step (214); if no, go to step (223) to carry out further decision.

(214) Operate the optical disk burner 16 to push out the optical disk mechanism 1613, and display the message "Please load the source optical disk into the optical disk burner" and go to step (215).

(215) Detect and determine whether or not a source optical disk is loaded into the optical disk burner 16; if yes, copy the data of the source optical disk into a hard disk drive of the personal computer 1 and go to step (216); if no, display the message "Please load the source optical disk into the optical disk burner" to ask the user to load the source optical disk.

(216) Detect and determine whether or not the data of the source optical disk is copied into the hard disk drive; if yes, operate the optical disk burner 16 to push out the optical disk mechanism 164 loaded with the source optical disk, so that the user can remove the source optical disk and display the message "Please load a blank optical disk into the optical disk burner." to request users to load a blank optical disk into the optical disk mechanism and then go to step (217); if no, continue copying the data of the source optical disk to the hard disk drive.

(217) Detect and determine whether or not a blank optical disk is loaded into the optical disk burner 16; if yes, start the optical disk burner 16 to copy the data of the source optical disk duplicated into the hard disk drive to the blank optical disk, and go to step (218); if no, display the message "Please load a blank optical disk into the optical disk burner." to request users to load a blank optical disk.

(218) Detect and determine whether or not the data of the source optical disk is copied to the blank optical disk; if yes, display the message "Duplication completed. Do you want to continue duplicating?" and operate the optical disk burner 16 to push out the optical disk mechanism, so that a user can remove the duplicated optical disk and load another blank optical disk, and then go to step (219); if no, continue the operation of copying the data of the source optical disk to the blank optical disk.

(219) Determine whether or not to continue duplicating; if yes, go to step (215); if no; return to step (200) to perform the general operation.

(223) Determine whether or not a trigger signal generated by pressing one of the configuration function key 1611 is received; if yes, go to step (224); if no, return to step (200) to perform the general operation.

(224) Determine whether or not the operating system of the personal computer 1 has created the "environment for duplicating files by a simple operation"; if yes, return to step (200) to perform the general operation; if no, request the operating system of the personal computer 1 to create the "environment for duplicating files by a simple operation" and generate an optical disk bucket icon on the screen of the monitor 17.

In another preferred embodiment of the present invention, after a user connects the optical disk burner 16 to a personal computer 1 and installs the driver program of the optical disk burner 16 in the personal computer 1, the operating system will automatically create an "environment for duplicating files by a simple operation" and generate a terminate and stay resident (TSR) optical disk bucket icon at the uppermost level of the screen of the monitor for a user to place the desired file. Thus, in such preferred embodiment of the present invention, it is not necessary to build any configuration function key 1611 on the housing of the optical disk burner 16 at all. It only needs to have the optical disk burning function key 1612 and the optical disk duplicating function key 1613. If a user wants to copy the data waiting for duplication in the optical disk bucket to an optical disk loaded in the optical disk burner 16, the user can select to press the optical disk burning function key 1612 to trigger the control circuit 163 to generate a control signal to drive the corresponding software for copying the data waiting for duplication in the optical disk bucket to the optical disk. If a user wants to duplicate a source optical disk, the user can press the optical disk duplicating function key 1613 to trigger the control circuit 163 to drive the corresponding software for displaying the simple messages such as "Please load the source optical disk", "Please remove source optical disk and load blank optical disk." to guide a user to quickly and successfully complete the file duplicating operation according to the instructions.

In view of the description above, the press key operating type optical disk duplicating system of the present invention provides users a more user-friendly and convenient-to-use optical disk burner, so that a user just need to press the function key built on the optical disk burner to drive the optical disk burner to directly copy the files of a personal computer to an optical disk or guide the user to quickly and successfully complete the file duplicating operation according to the simplest and most user-friendly instructions through the personal computer. Therefore, the present invention not only can save the time and effort to learn the complicated procedure of the traditional duplicating program for those users who often need to back up important data on a personal computer or burn data into an optical disk, but also can complete the optical disk burning (copying PC files to an optical disk) or optical disk duplication correctly by the simplest method to drastically reduce unnecessary waste caused by wrong operations and effectively improve working efficiency so that the general public will have more confidence and fun using computers.

While the invention has been described by examples and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance to that of the conventional structure and further complies with the patent application requirements and is submitted to the Patent and Trademark Office for review and granting of the commensurate patent rights.

What is claimed is:

1. A press key operating type optical disk duplicating system, comprising an optical disk burner, and said optical disk burner being coupled to a personal computer for selectively playing the data of an optical disk loaded in said optical disk burner and duplicating a file to an optical disk (burning an optical disk) or duplicating an optical disk loaded into said optical disk burner, characterized in that said optical disk burner comprising:
   at least one function key, each being disposed on said optical disk burner;
   a control circuit, having at least one general purpose I/O port, and said each general purpose I/O port being coupled separated to said each function key, such that when said each function key is pressed, said control circuit and a corresponding software installed in said personal computer are started to run a series of operations required for executing said optical disk burner and for completing the duplication of a file to an optical disk (burning of an optical disk) or the duplication of an optical disk selectively.

2. The press key operating type optical disk duplicating system of claim 1, wherein said control circuit drives said corresponding software to produce an optical disk bucket icon disposed on the screen of said personal computer as to permanently reside said optical disk bucket icon on the uppermost level of said screen for saving a file to be duplicated, if said control circuit detects a function key being pressed.

3. The press key operating type optical disk duplicating system of claim 2, wherein said optical disk bucket icon drives said corresponding software to display a message selected from the collection of "Please load a blank optical disk.", "Duplication completed." and the like to guide a user to complete a file duplicating operation according to instructions, if the total quantity of files and data waiting for a duplicating operation in said optical disk bucket equals to a predetermined maximum number for starting said duplicating operation.

4. The press key operating type optical disk duplicating system of claim 2, wherein said control circuit drives said corresponding software to display a message selected from the collection of "Please load a blank optical disk.", "Duplication completed." and the like to guide a user to complete a file duplicating operation according to instructions, if said control circuit detects another function key being pressed.

5. The press key operating type optical disk duplicating system of claim 2 further comprising a counter being selectively disposed at said optical disk bucket and at a position adjacent to said optical disk bucket for showing the total quantity of data saved in said optical disk bucket.

6. The press key operating type optical disk duplicating system of claim 1, wherein said optical disk burner is coupled to said personal computer and a driver program of said optical disk burner is installed in said personal computer, and then the operating system of said personal computer generates a terminate and stay resident (TSR) optical disk bucket disposed at the uppermost level of said screen of said personal computer for storing said file waiting for a duplication operation.

7. The press key operating type optical disk duplicating system of claim 6, wherein said control circuit drives said corresponding software to display a message selected from the collection of "Please load a blank optical disk.", "Duplication completed." and the like to guide a user to complete a file duplicating operation according to instructions, if said control circuit detects another function key being pressed.

8. The press key operating type optical disk duplicating system of claim 6 further comprising a counter being selectively disposed at said optical disk bucket and at a position adjacent to said optical disk bucket for showing the total quantity of data saved in said optical disk bucket.

9. The press key operating type optical disk duplicating system of claim 1, wherein said control circuit drives said corresponding software to display a simple message selected from the collection of "Please remove source optical disk and load blank optical disk.", "Duplication completed." and the like to guide a user to complete a file duplicating operation according to instructions, if said control circuit detects another function key being pressed.

10. The press key operating type optical disk duplicating system of claim 1, wherein said optical disk burner is an external optical disk burner and said each function key is disposed on a housing of said external optical disk burner.

11. The press key operating type optical disk duplicating system of claim 1, wherein said optical disk burner is a built-in optical disk burner and said each function key is disposed on a front panel of said built-in optical disk burner.

12. The press key operating type optical disk duplicating system of claim 1, wherein said optical disk burner is an external optical disk burner and said each function key is disposed on a front panel of said external optical disk burner.

* * * * *